(12) United States Patent
Feuerstack et al.

(10) Patent No.: US 9,379,553 B2
(45) Date of Patent: Jun. 28, 2016

(54) CONTROLLABLE ENERGY STORE AND METHOD FOR OPERATING A CONTROLLABLE ENERGY STORE

(75) Inventors: Peter Feuerstack, Ludwigsburg (DE); Erik Weissenborn, Stuttgart (DE); Martin Kessler, Schwaebisch Gmuend (DE)

(73) Assignee: Robert Bosch GmbH, Stuttgart (DE)

( * ) Notice: Subject to any disclaimer, the term of this patent is extended or adjusted under 35 U.S.C. 154(b) by 372 days.

(21) Appl. No.: 13/984,093

(22) PCT Filed: Dec. 7, 2011

(86) PCT No.: PCT/EF2011/072044
§ 371 (c)(1),
(2), (4) Date: Aug. 7, 2013

(87) PCT Pub. No.: WO2012/107126
PCT Pub. Date: Aug. 16, 2012

(65) Prior Publication Data
US 2013/0317661 A1 Nov. 28, 2013

(30) Foreign Application Priority Data
Feb. 8, 2011 (DE) .......................... 10 2011 003 810

(51) Int. Cl.
*G01R 11/02* (2006.01)
*G01N 27/416* (2006.01)
(Continued)

(52) U.S. Cl.
CPC ............... *H02J 4/00* (2013.01); *B60L 11/1812* (2013.01); *B60L 11/1814* (2013.01);
(Continued)

(58) Field of Classification Search
CPC .... B60L 11/1853; B60L 11/1864; H02J 1/00; Y10T 307/685; Y02T 10/7005; Y02T 10/7061
USPC ............. 307/77; 324/136, 426, 434; 320/108, 320/162
See application file for complete search history.

(56) References Cited

U.S. PATENT DOCUMENTS

| | | | | | |
|---|---|---|---|---|---|
| 5,642,275 | A | * | 6/1997 | Peng ........................ | H02M 7/49 363/137 |
| 5,889,668 | A | * | 3/1999 | Schauder ................ | H02M 7/49 323/207 |

(Continued)

FOREIGN PATENT DOCUMENTS

| | | |
|---|---|---|
| DE | 102009000674 | 8/2010 |
| DE | 102009000676 | 8/2010 |

(Continued)

OTHER PUBLICATIONS

International Search Report for Application No. PCT/EP2011/072044 dated Apr. 25, 2012 (2 pages).

*Primary Examiner* — Ronald Hartman, Jr.
(74) *Attorney, Agent, or Firm* — Michael Best & Friedrich LLP

(57) ABSTRACT

The invention relates to a controllable energy store (2) with n parallel energy supply branches (3-1, 3-2, 3-3), wherein n≥1, each said branch having a first energy supply sub-branch (3-11; 3-21; 3-31) and a second energy supply sub-branch (3-12; 3-22; 3-32) that is connected in parallel to said first energy supply sub-branch. Each energy supply sub-branch (3-11; 3-12; 3-21; 3-22; 3-31; 3-32) has at least one energy storing module (4), each of which comprises at least one electric energy storing cell (5) with a corresponding controllable coupling unit (6). The coupling units (6) disconnect the energy supply sub-branch (3-11; 3-12; 3-21; 3-22; 3-31; 3-32) or bridge the respective corresponding energy storing cells (5) or connect the respective corresponding energy storing cells (5) into the respective energy supply sub-branch (3-11; 3-12; 3-21; 3-22; 3-31; 3-32) dependent on control signals. The energy storing cells (5) of the energy storing modules (4) in the first energy supply sub-branch (3-11; 3-21; 3-31) and the energy storing cells (5) of the energy storing modules (4) in the second energy supply sub-branch (3-12; 3-22; 3-32) are arranged in an anti-parallel manner.

9 Claims, 1 Drawing Sheet

(51) Int. Cl.

| | |
|---|---|
| *H02J 3/00* | (2006.01) |
| *H02J 1/00* | (2006.01) |
| *H02J 7/00* | (2006.01) |
| *H02J 7/04* | (2006.01) |
| *H02J 7/16* | (2006.01) |
| *H02J 4/00* | (2006.01) |
| *B60L 11/18* | (2006.01) |
| *H01G 9/26* | (2006.01) |
| *H01G 11/08* | (2013.01) |
| *H01G 11/72* | (2013.01) |
| *H01M 10/44* | (2006.01) |
| *H02J 7/14* | (2006.01) |
| *B60L 15/00* | (2006.01) |

(52) U.S. Cl.
CPC ........ *B60L 11/1855* (2013.01); *B60L 11/1879* (2013.01); *B60L 15/007* (2013.01); *H01G 9/26* (2013.01); *H01G 11/08* (2013.01); *H01G 11/72* (2013.01); *H01M 10/441* (2013.01); *H02J 7/0013* (2013.01); *H02J 7/0024* (2013.01); *H02J 7/0065* (2013.01); *H02J 7/1492* (2013.01); *H02J 2007/0059* (2013.01); *H02J 2007/0067* (2013.01); *Y02E 10/766* (2013.01); *Y02E 60/13* (2013.01); *Y02T 10/645* (2013.01); *Y02T 10/705* (2013.01); *Y02T 10/7005* (2013.01); *Y02T 10/7022* (2013.01); *Y02T 10/7055* (2013.01); *Y02T 10/7072* (2013.01); *Y02T 10/7094* (2013.01); *Y02T 10/92* (2013.01); *Y02T 90/127* (2013.01); *Y02T 90/14* (2013.01)

(56) References Cited

U.S. PATENT DOCUMENTS

| | | | | |
|---|---|---|---|---|
| 6,621,719 | B2* | 9/2003 | Steimer | H02M 7/49 363/43 |
| 7,969,238 | B2* | 6/2011 | Bernhard | H02J 3/1857 327/552 |
| 8,374,009 | B2* | 2/2013 | Feng | H02M 7/483 363/65 |
| 8,385,086 | B2* | 2/2013 | Hiller | H02M 5/458 363/131 |
| 8,395,280 | B2* | 3/2013 | Graovac | H02M 7/79 307/82 |
| 2011/0254373 | A1* | 10/2011 | Johnson | H02M 7/483 307/77 |
| 2013/0200693 | A1* | 8/2013 | Butzmann | H02M 7/483 307/10.1 |
| 2014/0232332 | A1* | 8/2014 | Feuerstack | H02J 5/005 320/108 |

FOREIGN PATENT DOCUMENTS

| | | |
|---|---|---|
| JP | 2004282809 | 10/2004 |
| JP | 2009509483 | 3/2009 |

\* cited by examiner

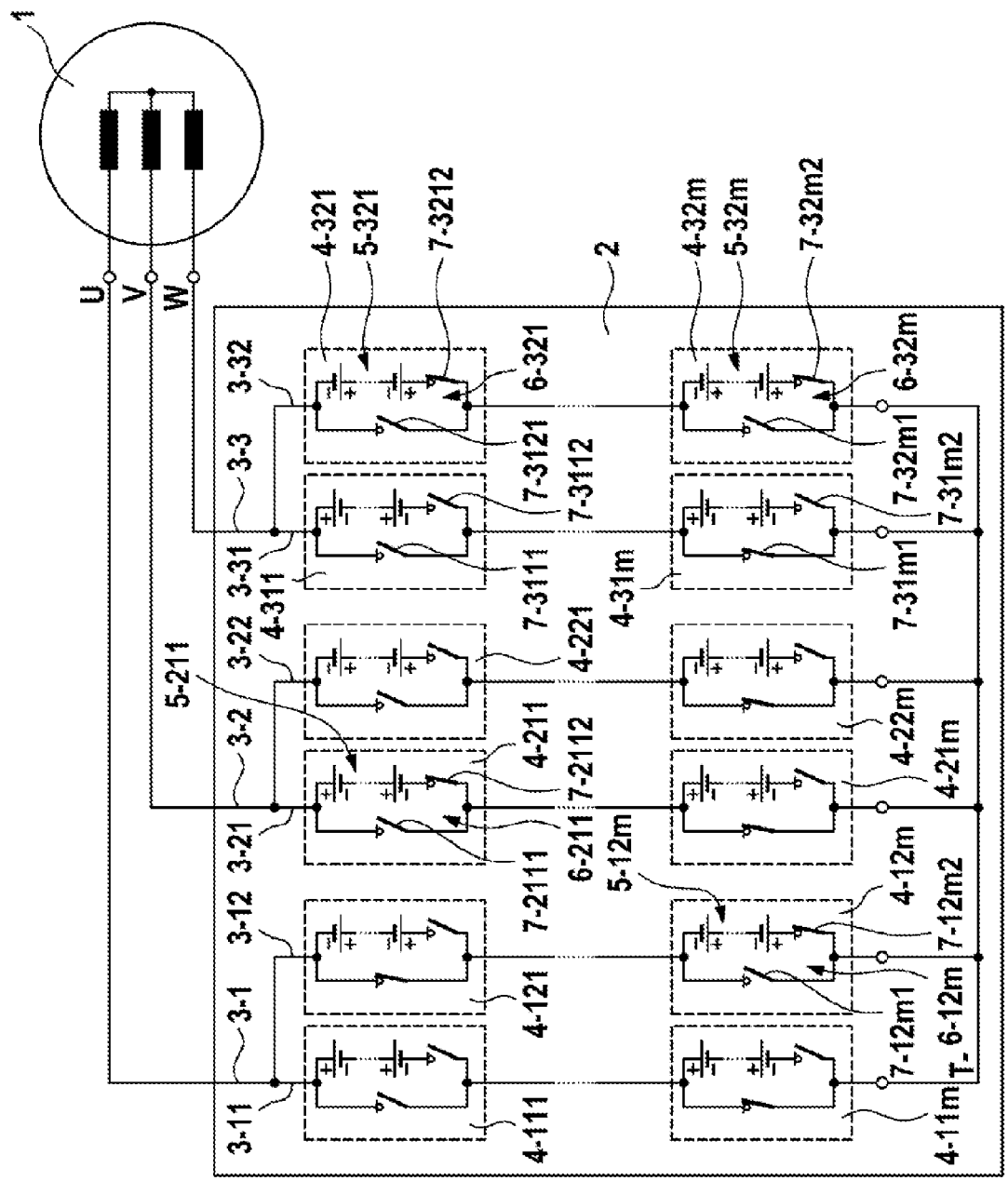

CONTROLLABLE ENERGY STORE AND METHOD FOR OPERATING A CONTROLLABLE ENERGY STORE

BACKGROUND OF THE INVENTION

The invention relates to a controllable energy storage device and a method for operating a controllable energy storage device.

It has become apparent that in future both in the case of stationary applications, for example wind turbines, and also in vehicles, for example hybrid vehicles or electric vehicles, electronic systems are being used ever more frequently, which electronic systems combine new energy storage technologies with electrical drive technology. In conventional applications an electrical machine, which is embodied for example as a three-phase machine, is controlled by way of a converter in the form of an AC converter. A characterizing feature of systems of this type is a so-called DC voltage intermediate circuit, by means of which an energy storage device, generally a battery, is connected to the DC voltage side of the AC converter. In order to be able to fulfill the particular requirements relating to power and energy for a particular application, a plurality of battery cells are connected in series. Since it is necessary for the current that is provided by an energy storage device of this type to flow through all the battery cells and a battery cell can only carry a limited amount of current, battery cells are often in addition connected in parallel in order to increase the maximum current.

When connecting a plurality of cells in series, the problem arises in addition to a high total voltage that the entire energy storage device fails if a single battery cell fails because it is then no longer possible for the current to flow through the battery. A failure of this type of the energy storage device can cause the entire system to fail. In the case of a vehicle, a failure of the drive battery causes the vehicle "to be immobilized". In other applications, for example in the case of a rotor blade adjustment in wind turbines, situations that pose a safety risk can even occur in unfavorable boundary conditions, for example in the case of a strong wind. Efforts are therefore continuously being made to achieve a high level of reliability of the energy storage device, wherein the term "reliability" describes the ability of a system to function in a fault-free manner for a predetermined period of time.

U.S. Pat. No. 5,642,275 A discloses a multi-level convertor having at least one phase, wherein each phase comprises a plurality of full bridge invertors having in each case allocated independent DC sources.

SUMMARY OF THE INVENTION

The present invention provides a controllable energy storage device having n parallel energy supply branches, wherein n≥1, which energy supply branches comprise a first energy supply sub-branch and a second energy supply sub-branch that is connected in parallel to said first energy supply sub-branch. Each energy supply sub-branch comprises in each case at least one energy storage module that comprises in each case at least one electrical energy storage cell having an allocated controllable coupling unit. In response to control signals, the coupling units disconnect the respective energy supply sub-branch or bridge the respectively allocated energy storage cells or connect the respectively allocated energy storage cells into the respective energy supply sub-branch. The energy storage cells of the energy storage modules in the first energy supply sub-branch and the energy storage cells of the energy storage module in the second energy supply sub-branch are arranged in an anti-parallel manner and consequently comprise opposite polarities.

The invention further provides a method for operating a controllable energy storage device in accordance with the invention, wherein the coupling units are controlled in such a manner that in dependence upon a desired output voltage of an energy supply branch one of the energy supply sub-branches of the energy supply branch is disconnected.

The invention is based on the fundamental idea of dividing each energy supply branch into two energy supply sub-branches that have in each case the reverse polarity of the allocated energy storage cells, in order in this manner to provide the option of reversing the voltage at the output of the energy storage module. In each case one of the energy supply sub-branches of the energy supply branch, namely the one with the "falsely polarized" energy storage cells, is disconnected in dependence upon a desired output voltage (positive or negative) of an energy supply branch. However, in contrast to the arrangement known from the prior art, it is not necessary that the coupling units are embodied as full bridges. On the contrary, the required function of the coupling units can also be achieved with a smaller number of controllable switch elements. This results in an operating current being carried by way of a smaller number of switch elements which in turn reduces the losses at the switch elements.

If the phases of an electrical machine are connected to the energy supply branches of the controllable energy storage device in accordance with the invention, then the phases can be connected in dependence upon the switched status of the coupling units either to a high positive reference potential, a middle reference potential or a low negative reference potential. The controllable energy storage device in accordance with the invention can in this respect also fulfill the function of a known AC convertor. Consequently, whilst appropriately controlling the coupling units, the output and operating mode of the electrical machine can be controlled by means of the controllable energy storage device.

In accordance with a preferred embodiment of the invention, the coupling unit are embodied as half bridges, so that the operating current is carried in each case only by way of a switch element of the respective energy storage module. The losses at the switch elements are minimized in this manner.

BRIEF DESCRIPTION OF THE DRAWING

Further features and advantages of the embodiments of the invention are evident from the description hereinunder with reference to the attached drawing.

In which:

FIG. 1 shows a schematic illustration of a controllable energy storage device in accordance with the invention.

DETAILED DESCRIPTION

FIG. 1 shows a schematic illustration of a controllable energy storage device in accordance with the invention. A controllable energy storage device 2 is connected to a three-phase electrical machine 1. The controllable energy storage device 2 comprises three energy supply branches 3-1, 3-2 and 3-3 that are connected on the one side to a reference potential T-(reference rail) that in the illustrated embodiments is maintained at a low potential, and on the other hand are connected in each case to individual phases U, V, W of the electrical machine 1. The energy supply branches 3-1, 3-2 and 3-3 comprise in each case a first energy supply sub-branch 3-11 or respectively 3-21 or respectively 3-31 and a second energy supply sub-branch 3-12 or respectively 3-22 or respectively 3-32 that is connected in parallel to said first energy supply sub-branch. Each energy supply sub-branch 3-11, 3-12, 3-21, 3-22, 3-31, 3-32 comprises in each case m series-connected energy storage modules 4-111 to 4-11$m$ or respectively 4-121 to 4-12$m$ or respectively 4-211 to 4-21$m$ or respectively 4-221 to 4-22$m$ or respectively 4-311 to 4-31$m$ or respectively 4-321 to 4-32$m$, wherein m≥2. The energy storage modules 4 on the other hand comprise in each case a plurality of series-connected electrical energy storage cells that for reasons of clarity are provided only in parts with reference numerals 5-12$m$, 5-211 and 5-321 to 5-32$m$. The energy storage modules 4 comprise furthermore in each case a coupling unit that is allocated to the energy storage cells 5 of the respective energy storage module 4. For reasons of clarity, only some coupling units are provided with reference numerals 6-12$m$, 6-211 and 6-321 to 6-32$m$. In the illustrated embodiment variants the coupling units 6 are formed in each case by two controllable switch elements 7-12$m$1 and 7-12$m$2 or respectively 7-2111 and 7-2112 or respectively 7-3211 and 7-3212 to 7-32$m$1 and 7-32$m$2, that are connected in each case in the form of a half bridge. The switch elements can be embodied as power semi-conductor switches, for example in the form of IGBTs (insulated gate bipolar transistors) or as MOSFETs (metal oxide semi-conductor field-effect transistors).

The coupling units 6 render it possible to disconnect the respective energy supply sub-branch 3-11, 3-12, 3-21, 3-22, 3-31, 3-32 by opening all switch elements 7 of a coupling unit 6. Alternatively, by closing in each case one of the switch elements 7 of a coupling unit 6, the energy storage cells 5 can either be bridged, for example closing the switch 7-3111, or said energy storage cells can be connected into the respective energy supply sub-branch, for example by closing the switch 7-3112.

The energy storage cells 5-111 to 5-11$m$, 5-211 to 5-21$m$ and 5-311 to 5-31$m$ in the first energy supply sub-branches 3-11 or respectively 3-21 or respectively 3-31 and the energy storage cells 5-121 to 5-12$m$, 5-221 to 5-22$m$ and 5-321 to 5-32$m$ in the second energy supply sub-branches 3-12 or respectively 3-22 or respectively 3-32 are arranged in an anti-parallel manner so that they comprise opposite polarities. In the illustrated exemplary embodiment, the positive poles of the energy storage cells in the first energy supply sub-branches 3-11, 3-21 and 3-31 face the phases U or respectively V or respectively W of the electrical machine 1 and the negative poles of these energy storage cells face the reference rail T. Accordingly, the negative poles of the energy storage cells in the second energy supply sub-branches 3-12, 3-22 and 3-32 face the phases U or respectively V or respectively W of the electrical machine 1 and the positive poles of these energy storage cells face the reference rail T.

In dependence upon a desired output voltage of an energy supply branch 3, in each energy supply branch 3-1, 3-2, 3-3 one of the energy supply sub-branches 3-11 or 3-12, 3-21 or 3-22, 3-31 or 3-32 of the respective energy supply branch 3-1 or respectively 3-2 or respectively 3-3 is disconnected. In the respective other energy supply sub-branch 3-12 or 3-11, 3-22 or 3-21, 3-32 or 3-31, the energy storage cells 5 of so many energy storage modules 4 are connected into the respective energy supply sub-branch 3-12 or 3-11, 3-22 or 3-21, 3-32 or 3-31 that the desired output voltage is set as the total output voltage of the respective energy supply branch 3 by virtue of correspondingly controlling the allocated coupling units 6.

The total output voltages of the energy supply sub-branches 3-11, 3-12, 3-21, 3-22, 3-31, 3-32 and consequently the energy supply branches 3-1 to 3-3 are determined by means of the respective switched state of the controllable switch elements 7 of the coupling units 6 and can be adjusted in a stepped manner. The adjustment is performed in steps in dependence upon the voltage of the individual energy storage modules 4. If it is assumed that the energy storage modules 4 are embodied in an identical manner in the preferred embodiment, then a maximum possible total output voltage arises from the voltage of an individual energy storage module 4 times the number m of the series-connected energy storage modules 4 per energy supply branch 3. As a result of the energy supply branches 3 being sub-divided into in each case two energy supply sub-branches with opposite polarities of the respective energy storage cells 5, the voltages can be generated both with a positive and also with a negative algebraic sign.

It is assumed in the case of the specific exemplary embodiment illustrated in FIG. 1 that the energy supply branches 3-1 and 3-3 are to deliver a negative voltage. For this purpose, on the one hand the two energy supply sub-branches 3-11 or respectively 3-31 that are used to deliver a positive voltage are disconnected by virtue of correspondingly controlling at least one of the coupling units 6 in the respective energy supply sub-branch 3-11 and 3-31. This is specifically achieved by virtue of the fact that, as illustrated for example, in each case two switch elements 7 of the coupling units 4-111 or respectively 4-311 are opened. On the other hand, in the energy supply sub-branches 3-12 and 3-32, by virtue of correspondingly controlling the coupling units 6 so many energy storage cells 5 are connected into the respective energy supply sub-branch 3-12 or respectively 3-32 that the desired negative output voltage is achieved. The remaining energy storage cells 5 in these energy supply sub-branches 3-12 and 3-32 are bridged in each case by virtue of correspondingly controlling the allocated coupling units 6. By way of example in FIG. 1, the energy storage cells 5-12$m$ of the energy storage module 4-12$m$ and also 5-321 and 5-32$m$ of the energy storage modules 4-321 or respectively 4-32$m$ are connected into the respective energy supply sub-branch 3-12 or respectively 3-32 (switch elements 7-12$m$1 or respectively 7-3211 or respectively 7-32$m$1 are opened and switch elements 7-12$m$2 or respectively 7-3212 or respectively 7-32$m$2 are closed. The energy storage cells 5 of the energy storage module 4-111 on the other hand are bridged (the two switch elements 7 are opened.

It is further assumed in the case of the exemplary embodiment as shown in FIG. 1, that the energy supply branch 3-2 is to deliver a positive voltage. For this purpose, in a similar manner the "falsely polarized" energy supply branch, in this case 3-22 is on the one hand disconnected. On the other hand, a sufficient number of energy storage cells 5 is connected into the other energy supply sub-branch 3-21. In the specifically illustrated example, the energy storage cells 5-211 of the energy storage module 4-211 are connected into the energy supply sub-branch 3-21 and consequently into the energy supply branch 3-2 by virtue of opening the switch elements 7-2111 and closing the switch elements 7-2112, whereas the energy storage cells 5 of the energy storage module 4-21$m$ are bridged.

The coupling units 6 consequently render it possible to connect the phases U, V, W of the electrical machine 1 independently of each other either to a high positive reference potential, a middle reference potential or a low negative reference potential and in this respect also to fulfill the function of a known AC convertor. Consequently, whilst appropriately controlling the coupling units 6, the output and operating mode of the electrical machine 1 can be controlled by means of the controllable energy storage device 2. The controllable energy storage device 2 therefore fulfills in this respect a dual function, since on the one hand it is used to supply the electrical energy but on the other hand it is also used to control the electrical machine 1.

The electrical machine 1 comprises stator windings 8-U, 8-V and 8-W that are mutually connected in a known manner in a star circuit.

The electrical machine 1 is embodied in the illustrated exemplary embodiments as a three-phase machine but it can also comprise fewer than or more than three phases. The number of energy supply branches 3 in the controllable energy storage device 2 naturally also depends upon the number of phases of the electrical machine.

In the illustrated exemplary embodiments, each energy storage module 4 comprises in each case a plurality of series-connected energy storage cells 5. However, the energy storage modules 4 can alternatively also comprise in each case only a single energy storage cell or also parallel-connected energy storage cells.

In the illustrated exemplary embodiments, the coupling units 6 are embodied in each case by means of two controllable switch elements 7 in the form of a half bridge. However, the coupling units 6 can also be achieved with the aid of other interconnections or also by means of more or fewer controllable switch elements as long as it is possible to achieve the necessary functions (disconnecting the energy supply sub-branches, bridging the energy supply cells and connecting the energy supply cells into the energy supply sub-branch).

The controllable energy storage device 2 also renders it possible to set a desired output voltage that is present between two voltage steps. For this purpose, one of the coupling units 6 of the affected energy supply branch 3 is controlled in such a pulsating manner during a predetermined duty cycle that the arithmetical mean value of the total output voltage of an energy supply sub-branch or respectively of an energy supply branch 3 corresponds to the desired output voltage. The energy storage cells 5 that are allocated respectively to this coupling unit 6 are connected for the duration of a pulse into the respective energy supply branch 3 and are bridged for the duration of a pause.

The invention claimed is:

1. A controllable energy storage device having n parallel energy supply branches wherein n≥1, which energy supply branches comprise a first energy supply sub-branch and a second energy supply sub-branch that is connected in parallel to said first energy supply sub-branch, wherein:
   each energy supply sub-branch includes at least one energy storage module that comprises at least one electrical energy storage cell having an allocated controllable coupling unit,
   in response to control signals, the coupling units disconnect the energy supply sub-branch or bridge the respectively allocated energy storage cells or connect the respectively allocated energy storage cells into the respective energy supply sub-branch, and
   the energy storage cells of the energy storage modules in the first energy supply sub-branch and the energy storage cells of the energy storage modules in the second energy supply sub-branch are arranged in an anti-parallel manner.

2. The controllable energy storage device as claimed in claim 1, wherein the coupling units are embodied as half bridges.

3. A method for operating a controllable energy storage device as claimed in claim 1, the method comprising:
   controlling the coupling units in such a manner that in dependence upon a desired output voltage of an energy supply branch one of the energy supply sub-branches of the energy supply branch is disconnected.

4. The controllable energy storage device as claimed in claim 1, wherein the at least one electrical energy storage cell in the first energy supply sub-branch provides positive voltage to the supply branch and the at least one electrical energy storage cell in the second energy supply sub-branch provides negative voltage to the supply branch.

5. The controllable energy storage device as claimed in claim 1, wherein the first energy supply sub-branch and the second energy supply sub-branch are each connected to a reference rail and the first and second sub-branches connect to an input of a three phase electrical machine.

6. A controllable energy storage device having at least two parallel energy supply branches, each said energy supply branch including a first energy supply sub-branch and a second energy supply sub-branch that is connected in parallel to said first energy supply sub-branch, wherein:
   each of the first and second energy supply sub-branches includes at least two energy storage modules in series each that include at least one electrical energy storage cell having an allocated controllable coupling unit,
   the energy storage cells of the energy storage modules in the first energy supply sub-branch and the energy storage cells of the energy storage modules in the second energy supply sub-branch are arranged in an anti-parallel manner,
   in response to control signals, the coupling units disconnect the first energy supply sub-branch or bridge the respectively allocated energy storage cells or connect the respectively allocated energy storage cells into the first energy supply sub-branch, and disconnect the second energy supply sub-branch or bridge the respectively allocated energy storage cells or connect the respectively allocated energy storage cells into the second energy supply sub-branch.

7. The controllable energy storage device as claimed in claim 6, wherein each of the first and second energy supply sub-branches of the at least two parallel energy supply branches are connected to a reference rail.

8. The controllable energy storage device as claimed in claim 7, wherein the at least two parallel energy supply branches are connected to a different input of an electrical machine.

9. The controllable energy storage device as claimed in claim 7, wherein the at least two parallel energy supply branches comprise three parallel energy supply branches, and each of the three parallel energy supply branches is connected to a different input of a three phase electrical machine.

\* \* \* \* \*